US006180699B1

(12) United States Patent
Bakeev et al.

(10) Patent No.: US 6,180,699 B1
(45) Date of Patent: Jan. 30, 2001

(54) BLEND FOR PREVENTING OR RETARDING THE FORMATION OF GAS HYDRATES

(75) Inventors: Kirill N. Bakeev, Ringwood; Randall T. Myers, Lincoln Park; David E. Graham, Long Valley, all of NJ (US)

(73) Assignee: ISP Investments Inc., Wilmington, DE (US)

( * ) Notice: Under 35 U.S.C. 154(b), the term of this patent shall be extended for 0 days.

(21) Appl. No.: 09/496,870

(22) Filed: Feb. 2, 2000

(51) Int. Cl.$^7$ ...................................... C07C 7/20
(52) U.S. Cl. ................ 524/104; 95/153; 137/3; 137/13; 166/304; 166/310; 166/311; 507/90; 507/246; 524/376; 524/379; 524/391; 524/514; 585/5; 585/24; 585/950
(58) Field of Search ..................... 524/376, 104, 524/379, 391, 514; 585/15, 24, 950; 137/3, 13; 166/310, 311, 304, 371; 95/153; 507/90, 246

(56) References Cited

U.S. PATENT DOCUMENTS

| | | | |
|---|---|---|---|
| 5,723,524 | 3/1998 | Cohen et al. | 524/376 |
| 5,741,758 | 4/1998 | Pakulski | 507/90 |
| 5,874,660 | 2/1999 | Colle et al. | 585/15 |
| 6,025,302 | 2/2000 | Pakulski | 507/90 |

*Primary Examiner*—Ana Woodward
(74) *Attorney, Agent, or Firm*—Walter Katz; William J. Davis; Marilyn J. Maue

(57) ABSTRACT

A composition is provided herein for preventing or retarding the formation of gas hydrates or for reducing the tendency of gas hydrates to agglomerate, during the transport of a fluid comprising water and a hydrocarbon, through a conduit. The composition is a homopolymer of vinyl caprolactam having the low molecular weight in the range of 500 to 2500, or copolymers or terpolymers thereof, and a polyoxyalkylenediamine or a polyoxyarylenediamine. Such homopolymers, copolymers and terpolymers, preferably are made and applied in the defined solvent, which, most preferably, is a glycol ether such as 2-butoxyethanol.

7 Claims, No Drawings

BLEND FOR PREVENTING OR RETARDING THE FORMATION OF GAS HYDRATES

CROSS REFERENCE TO RELATED APPLICATIONS

Reference is hereby made to commonly-owned U.S. Ser. No. 09/415,657, filed Oct. 12, 1999, which describes compositions for preventing or retarding the formation of gas hydrates featuring copolymers of vinyl caprolactam and vinyl pyridine and terpolymers thereof with vinyl pyrrolidone, and to commonly-owned U.S. Ser. No. 09/416, 307, filed Oct. 12, 1999, which describes a process of corrosion inhibition of a steel pipeline during transport of water, gas, oil or mixtures thereof, including introducing a copolymer of vinyl caprolactam and vinyl pyridine into the pipeline.

BACKGROUND OF THE INVENTION

1. Field of the Invention

The invention relates to a method for preventing or retarding the formation of gas hydrates or for reducing the tendency of such hydrates to agglomerate during the transport of a fluid comprising water and a hydrocarbon through a conduit, and, more particularly, to the addition to the fluid of a blend of a low molecular weight vinyl caprolactam polymer, or copolymers thereof, which are preferably made and applied in a suitable solvent, and a polyoxyalkylenediamine, to inhibit such gas hydrate formation.

2. Description of the Prior Art

It is well known in the art that the formation of gas hydrates in a conduit, e.g. a pipeline, during the transport of liquids, such as oil, and gases, particularly lower hydrocarbons, e.g. methane, ethane, propane, butane, isobutane and natural gas is a serious problem, especially in areas with a low temperature in the winter season or in the sea. Generally the temperatures are so low that gas hydrate formation, due to the inevitable presence of co-produced water in the wells takes place, if no special steps are taken. Insulation decreases the chance of gas hydrate formation; however, if the field is relatively small and far away from the production platform, the costs of using insulation are too high to make such field economically attractive. It is also known to add anti-freeze compounds, for example, glycol or methanol, during transport to minimize gas hydrate formation; however, large quantities of these compounds are required to be effective which is expensive. Alkyl glycosides also have been used for this purpose.

A representation of the prior art in this field are the following U.S. Pat. Nos. 4,915,176; 5,420,370; 5,432,292; 5,723,524; and 5,741,758; EPA 0526929A1; EPO 0323774A1; Can. Pat. Appln 2,073,577; WO 93/25798; WO95/17579; Gas Hydrates and Hydrate Prevention 73 GPA Annual Convention, pgs 85–93; WO 96/108456; WO 96/108636; WO 93/25798; EPA 0457375and WO 9412761.

The poly(vinyl caprolactam) (PVCL) described in U.S. Pat. No. 5,723,524 was synthesized in isopropanol and had an average molecular weight of 36,000 amu, as determined using size exclusion chromatography, otherwise known in the art as gel permeation chromatography (GPC, polyethylene glycol as standard).

The polyoxyalkylenediamines described in U.S. Pat. No. 5,741,758 was considered a more effective kinetic inhibitor than commercially available GAFFIX® VC-713 (International Specialty Products), a terpolymer of vinyl caprolactam/polyvinylpyrrolidone/dimethylaminoethyl methacrylate having an average molecular weight of approximately 200,000, or PVP (International Specialty Products), polyvinylpyrrolidone.

SUMMARY OF THE INVENTION

What is described herein is a useful composition for effectively preventing or retarding the formation of gas hydrates, or for reducing the tendency of gas hydrates to agglomerate, during the transport of a fluid comprising water and a hydrocarbon, through a conduit, comprising a blend composition of vinyl caprolactam homopolymer (PVCL) having a low molecular weight, of about 500 and about 2500, or copolymers or terpolymers thereof, preferably with vinyl pyrrolidone (VP), and a polyoxyalkylenediamine, described in U.S. Pat. No. 5,741, 758, or a polyoxyarylenediamine in a suitable solvent. Preferably, the homopolymer or copolymer is made and applied in a low molecular weight glycol ether, which, most preferably, is 2-butoxyethanol (BGE).

It was surprising and unexpected that polyvinyl caprolactam, a known gas hydrate inhibitor, could be partly replaced with an amine, which itself is a poorer gas hydrate inhibitor, to provide compositions with superior gas hydrate inhibition performance properties compared to the polyvinyl caprolactam formulation. Further, it is believed that the blend of this invention inhibits corrosion of metals in a pipeline system.

DETAILED DESCRIPTION OF THE INVENTION

The caprolactam polymer in the blend composition of the invention with polyoxyalkylenediamine which exhibits advantageous inhibitory characteristics is a homopolymer of vinyl caprolactam, or copolymer or terpolymer thereof, having a molecular weight of about 500 to about 2500, as determined by GPC using polyethylene glycol as the standard.

Generally, the blend of caprolactam polymer and polyoxyalkylenediamine is present in an amount of about 30 to 50% by weight of the composition, i.e. in admixture with the solvent. The blend inhibition concentration in the pipeline, i.e. in the aqueous phase, is about 0.1 to 3% by weight. The solvent inhibition concentration, accordingly, is about 0.1 to 5% by weight in the aqueous phase.

Suitable solvents include low molecular glycol ethers containing an alkoxy group having at least 3 carbon atoms, N-methylpyrrolidone (NMP), ethylene glycol, water and blends thereof. Representative glycol ethers include 2-butoxyethanol (ethylene glycol monobutyl ether); propylene glycol butyl ether; (diethylene glycol) monobutyl ether; and 2-isopropoxy-ethanol.

2-Butoxyethanol (BGE) is preferred.

Preferably the low molecular weight caprolactam polymer or copolymers are made in the desired solvent and maintained therein in the composition of the invention. Less preferably, they are made in another solvent, such as isopropanol solvent, the solvent removed, and the desired glycol ether solvent added.

The composition of the invention also includes low molecular weight copolymers and terpolymers of vinyl caprolactam with one or more monomers selected from vinylpyrrolidone; acrylamide; N-alkyl acrylamides, e.g. N,N-dimethylamino acrylamide; N-[1-(2-pyrrolidonylethyl)] acrylamide; N,N-dialkyl aminoalkyl methacrylamide, e.g. N,N-dimethylamino propyl methacrylamide; N,N-dialkyl aminoalkyl (meth)acrylates; e.g. N,N-dimethylaminoethyl (meth)acrylate and quaternized salts thereof, including N-alkyl bromides; tetrahydrofurfuryl methacrylate; and the like. A copolymer with vinylpyrrolidone monomer is preferred.

The polyoxyalkylenediamine component of the synergistic low molecular weight polyvinyl caprolactam-polyoxyalkylenediamine/polyoxyalkylenediamine blend composition of the invention is described in detail in U.S. Pat. No. 5,741,758. Useful diamines generally have the general formula:

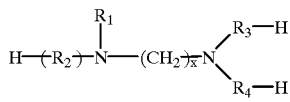

(I)

where x = 1-4, $R_1$ is an alkyl or aryl group containing from 1 to 20, preferably 1 to 6 carbon atoms,

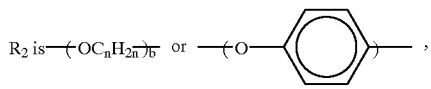

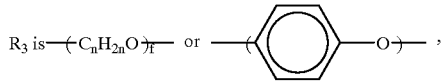

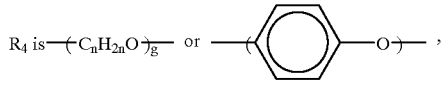

(b + f + g) is 0 to 30, and n is 2 to 3.

Preferred compounds have the following general formula:

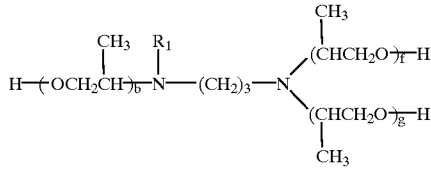

(II)

where R has 16 to 18 carbon atoms.

Other preferred compounds of the above formulae have the sum of b +f+g from about 20 to about 30, most preferably 25 to 30. Compounds of Formula (II) are commercially marketed as ETHODUOMEEN® T/25 by AKZO NOBEL and commonly referred to as polyethoxylated tallow propylenediamine.

A compound of the formula

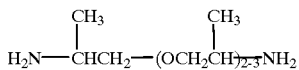

Is commercially marketed by Huntsman Corp. as JEFFAMINE® D-230 and is a polyoxypropylene diamine.

A compound having the structure:

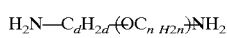

Is marketed by Huntsman Corp. as JEFFAMINE® EDR-148 and is a triethylene glycol diamine.

The following examples are provided to illustrate the invention.

GENERAL METHOD

The gas hydrate inhibition tests were conducted in a 500 ml, 316 stainless steel autoclave vessel having a usable volume of 200 ml, equipped with a thermostated cooling jacket, sapphire window, inlet and outlet, platinum resistance thermometer (PRT) and magnetic stirring pellet. The rig is rated up to 400° C. and down to −25° C. Temperature and pressure are data logged, while the cell content is visually monitored by a boroscope video camera connected to a time lapsed video recorder. Hydrate formation in the rig is detected using a combination of three methods: visual detection of hydrate crystals, decrease in vessel pressure due to gas uptake and by the temperature exotherm created by heat released during hydrate formation.

The rig was cleaned prior to running a blank and/or test solutions. An air drill with wet and dry emery paper was used to remove traces of any adsorbed chemicals therein with a small amount of water added to the rig. The vessel was then rinsed several times with double distilled water. A blank solution of 200 ml of double distilled water was run to confirm test reproducibility. The formation of hydrates within 4–15 minutes was taken as a standard time for a given set of testing conditions, i.e. synthetic gas, 60 bar and 4° C. The cleaning procedue was repeated until a reproducible time was achieved.

Synthetic gas mixture of the following composition was used for hydrate testing:

| Component | Mol % |
|---|---|
| $CO_2$ | 1.0 |
| Methane | 95.31 |
| Ethane | 2.96 |
| Propane | 0.53 |
| Iso-Butane | 0.1 |
| n-Butane | 0.1 |

Experimental Procedure for Evaluation of Hydrate Inhibitors 200 ml of pre-cooled polymer solution (with total concentration equal to 0.3 wt %) was placed into the vessel, followed by a PTFE stirrer pellet. The rig top was replaced and the securing ring tightened. The boroscope and video camera were then attached to the apparatus. The rig was then stirred and allowed to cool to the required temperature. Upon reaching the pre-set temperature, the stirrer was stopped and the video recorder and computer data logger started. The rig was then charged with Ravenspurn gas to reach the required pressure. A slightly higher pressure (2–3 bars) was used to allow for some gas dissolution in the water and the slight drop in the pressure as the gas cools. The stirrer was started at 500 rpm and the temperature (2.5° C.), pressure (65 bar) and start time ($t_o$) recorded. The run was terminated upon the formation of hydrates, usually at the moment of a pressure drop, which might or might not follow the exotherm and visual hydrates formation depending on the amount of the hydrates formed and the amplitude of the effect. The final temperature, pressure and time (t) of the hydrates formation were noted.

The onset of the hydrate formation time=$t-t_o$ (mins) is indicated in the examples given below. The relative efficiencies of the inhibiting polymers are thus proportional to the measured induction times.

Since the equilibrium melting temperature for hydrate decomposition for the Ravenspurn gas in double distilled water and P=65 bar is about 13.5° C., the hydrate subcooling is equal to 11° C. (T=2.5° C. is the temperature of the measurements).

Example 1 illustrates the hydrate inhibition characteristics of low molecular weight poly(vinyl caprolactam) (PVCL) alone, made directly in 2-butoxyethanol (BGE).

EXAMPLE 1

(Standard A)

300 g. of 2-butoxyethanol was charged into a 1-liter resin reaction fitted with a propeller agitator, a reflux condenser, a nitrogen inlet tube and a thermowatch, and heated to 150° C. A monomer pre-mix was prepared by mixing 200 g. of vinyl caprolactam with 4.00 g of di-t-butyl peroxide initiator in a 400-ml beaker. Then the monomer pre-mix was pumped into the reaction kettle over a period of 2 hours. The reaction mixture then was held at 150° C. for 1.5 hours before adding 0.50 g of di-t-butyl peroxide initiator, and held at 150° C. for an additional 3 hours. After cooling to room temperature, the product was a light brown, viscous poly(vinyl caprolactam) (PVCL) in 2-butoxyethanol (BGE) at 40% solids. Residual vinyl caprolactam was 0.9% by GC analysis. The PVCL polymer had a relative viscosity of 1.074 (1% in 2-butoxyethanol), a GPC molecular weight of 1,210 (polyethylene glycol standard), and a cloud point of 42° C.

Hydrate inhibition testing of the product at 2.5° C., 65 bar using the chosen synthetic gas indicated that a composition of 0.3 wt% PVCL with 0.45 wt % BGE in distilled water gave $t-t_o=255\pm79$ min. induction time taken as an average of 6 runs under identical conditions.

EXAMPLE 2

(Standard B)

The testing procedure of Example 1 was followed using a standard test sample of 0.30 wt % polyoxyalkylenediamine of Formula above commercially marketed as JEFFAMINE®D-230 by Huntsman Corp. and commonly referred to as polyoxypropylene diamine and 0.45 wt % BGE in distilled water gave $t-t_o=42\pm18$ min. induction time taken as an average of 3 runs under identical test conditions.

EXAMPLE 3

The test procedure of Example 1 was followed using a blend composition of 0.15 wt % PVCL (of Example 1), 0.15 wt % oxyalkylene substituted polyamine (of Example 2), and 0.45 wt % BGE in distilled water gave $t-t_o=868\pm364$ min. induction time taken as an average of 6 runs under identical test conditions.

EXAMPLE 4

Example 3 was repeated with a blend composition of 0.10 wt % PVCL, 0.20 wt % polyoxyalkylenediamine of Example 2, and 0.45 wt % BGE in distilled water gave $t-t_o=437\pm239$ min. induction time taken as an average of 3 runs under identical test conditions.

EXAMPLE 5

Example 3 was repeated with a blend composition of 0.20 wt % PVCL, 0.10 wt % polyoxyalkylenediamine and 0.45 wt % BGE in distilled water gave $t-t_o=759\pm201$ min. induction time taken as an average of 3 runs under the identical conditions.

EXAMPLE 6

The procedure of Example 1 with a low molecular weight vinyl caprolactam (VCL)/vinyl pyrrolidone (VP) (75/25) copolymer made in 2-butoxyethanol. Similar results were obtained.

While the invention has been described with particular reference to certain embodiments thereof, it will be understood that changes and modifications may be made which are within the skill of the art

What is claimed is:

1. A composition for preventing or retarding the formation of gas hydrates or for reducing the tendency of gas hydrates to agglomerate, comprising, (a) a homopolymer of vinyl caprolactam, or copolymer or terpolymer thereof, having a molecular weight in the range of about 500 to about 2500 and (b) a polyoxyalkylenediamine or polyoxyarylenediamine.

2. The composition according to claim 1 which includes a solvent which is selected from the group consisting of a glycol ether containing an alkoxy group having at least 3 carbon atoms, NMP, water, ethylene glycol and blends thereof.

3. The composition according to claim 2 wherein said solvent is 2-butoxyethanol.

4. The composition according to claim 2 wherein said homopolymer, copolymer or terpolymer is synthesized and used in said solvent.

5. The composition according to claim 1 wherein said polymer, copolymer or terpolymer comprises about 30 to about 50% by weight of said composition.

6. A method of preventing or retarding the formation of gas hydrates or for reducing the tendency of gas hydrates to agglomerate, during the transport of a fluid comprising water and a hydrocarbon, through a conduit which comprises including a composition of claims 1–5.

7. A method according to claim 6 wherein said gas hydrate inhibiting polymer, copolymer or terpolymer concentration in the conduit is about 0.1 to 3% by weight.

* * * * *